(12) United States Patent
Fan et al.

(10) Patent No.: US 11,433,656 B2
(45) Date of Patent: Sep. 6, 2022

(54) CONTINUOUS VACUUM PRODUCTION METHOD FOR LAMINATED GLASS

(71) Applicant: Qingdao Glorious Future Energy-saving Glass Co., Ltd, Qingdao (CN)

(72) Inventors: Yiping Fan, Qingdao (CN); Qingbo Lv, Qingdao (CN)

(73) Assignee: Qingdao Glorious Future Energy-saving Glass Co., Ltd, Qingdao (CN)

( * ) Notice: Subject to any disclaimer, the term of this patent is extended or adjusted under 35 U.S.C. 154(b) by 0 days.

(21) Appl. No.: 17/147,040

(22) Filed: Jan. 12, 2021

(65) Prior Publication Data

US 2021/0354433 A1  Nov. 18, 2021

(30) Foreign Application Priority Data

May 18, 2020 (CN) ......................... 202010418746.X

(51) Int. Cl.
*B32B 37/10* (2006.01)
*B32B 17/10* (2006.01)
(Continued)

(52) U.S. Cl.
CPC .......... *B32B 37/1018* (2013.01); *B32B 17/10* (2013.01); *B32B 37/08* (2013.01); *B32B 41/00* (2013.01); *B32B 2250/40* (2013.01)

(58) Field of Classification Search
CPC ........ B32B 17/10972; B32B 17/10807; B32B 17/10816; B32B 17/10981;
(Continued)

(56) References Cited

U.S. PATENT DOCUMENTS

2001/0007270 A1* 7/2001 Balduin ............ B32B 17/10844
156/99
2005/0103426 A1* 5/2005 Chick ............... B32B 17/10743
156/106

(Continued)

FOREIGN PATENT DOCUMENTS

CN  109733045 A  *  5/2019
CN  110682633 A  *  1/2020

OTHER PUBLICATIONS

Machine translation of CN 109733045 date uknown.*
Machine translation of CN 110682633 date uknown.*

*Primary Examiner* — John L Goff, II
(74) *Attorney, Agent, or Firm* — Crawford Maunu PLLC

(57) ABSTRACT

A production method for laminated glass: loading laminated glass into a vacuum inlet chamber, evacuating to a first vacuum pressure, and transferring the glass at a high speed; transferring the glass to a vacuum inlet buffer chamber, and evacuating to a second vacuum pressure; transferring the glass to a vacuum inlet transfer chamber, reducing the transfer speed, and evacuating to a third vacuum pressure; transferring the glass to a vacuum heating chamber, maintaining a third vacuum pressure, and heating; transferring the glass to a vacuum cooling chamber, maintaining a third vacuum pressure, and cooling; transferring the glass to a vacuum outlet transfer chamber, maintaining a third vacuum pressure, and increasing the transfer speed; transferring the glass to a vacuum outlet buffer chamber, and dropping a vacuum pressure to a second vacuum pressure; transferring the glass to a vacuum outlet chamber, dropping a vacuum pressure to a first vacuum pressure.

20 Claims, 2 Drawing Sheets

(51) Int. Cl.
*B32B 37/08* (2006.01)
*B32B 41/00* (2006.01)

(58) Field of Classification Search
CPC ... B32B 17/1099; B32B 17/10; B32B 37/003; B32B 37/1018; B32B 37/06; B32B 37/08; B32B 39/00; B32B 41/00; B32B 2309/02; B32B 2309/68; B32B 2309/14; B32B 17/10825; B32B 17/10834; B32B 17/10844; B32B 17/10853; B32B 17/10862; B32B 17/10871; C03C 27/10; B29C 66/00145; B29C 66/342; B29C 66/82661; B29C 2043/561; B29C 66/93; B29C 66/934; B29C 66/93441; B29C 66/939; E06B 3/6775; E06B 3/6612
USPC ............ 156/99, 103, 104, 285, 286; 100/90
See application file for complete search history.

(56) References Cited

U.S. PATENT DOCUMENTS

| | | | | |
|---|---|---|---|---|
| 2009/0151853 | A1* | 6/2009 | Cooper | E06B 3/6775 |
| | | | | 156/104 |
| 2013/0291599 | A1* | 11/2013 | Zhao | C03B 23/245 |
| | | | | 65/152 |

* cited by examiner

CONTINUOUS VACUUM PRODUCTION METHOD FOR LAMINATED GLASS

TECHNICAL FIELD

The present disclosure relates to the technical field of production methods for laminated glass, in particular, to a continuous vacuum production method for laminated glass.

BACKGROUND

The traditional laminated glass production line includes two independent processes. The first process is preheating and rolling. After the pre-treatment of cleaning and laminating, the laminated glass is heated to 120-150° C. in a preheating furnace to make the film fused and in good contact with the glass. Then the glass is rolled by a roller press to discharge the air between the glass and the film, and is naturally cooled and removed from the rack. At this time, the air between the glass sheets is not exhausted, and the laminated glass is semi-transparent and edge-sealed. The second process is high-temperature high-pressure forming. The edge-sealed laminated glass is placed in an autoclave at 120-150° C. and 1.2-1.5 MPa for about 2 h to discharge residual air and make the glass and the film laminated together to form transparent laminated glass.

The traditional laminated glass production line has many drawbacks. (1) Low production efficiency. Since the glass is formed in the autoclave, the yield of glass depends entirely on the volume of the autoclave. Moreover, the autoclave requires the glass to undergo a series of processes such as temperature rise, pressure rise, temperature fall and pressure fall in the closed space, which takes at least several hours. (2) High energy consumption. The glass is subjected to preheating and rolling and high-temperature high-pressure forming. The preheating requires a temperature of 120-150° C., and the forming in the autoclave requires a temperature of 120-150° C. and a pressure of 1.2-1.5 MPa, which all require great energy consumption. (3) Difficulty in guaranteeing product quality. The production process involves many factors, such as the preheating temperature, the height, flatness and pressure during rolling, and the temperature and pressure and their rates of rise and fall in the autoclave. If these factors are not precisely controlled, they will cause bubbles in the glass to make the glass unqualified. (4) Single product category. The rolling process is a flat pressing process, so it is impossible to exhaust air in the curved glass, and it is hard to produce curved laminated glass.

SUMMARY

In order to solve the above-mentioned technical problems, the present disclosure provides a continuous vacuum production method for laminated glass. The present disclosure solves the technical problems of low production efficiency, high energy consumption, difficulty in guaranteeing product quality and single product category.

The present disclosure provides a continuous vacuum production method for laminated glass, including the following steps: loading laminated glass into a vacuum inlet chamber, evacuating to a first vacuum pressure, and transferring the glass at a high speed; transferring the glass to a vacuum inlet buffer chamber, and evacuating to a second vacuum pressure; transferring the glass to a vacuum inlet transfer chamber, reducing the transfer speed for low-speed transfer, and evacuating to a third vacuum pressure; transferring the glass to a vacuum heating chamber, maintaining a third vacuum pressure, and heating; transferring the glass to a vacuum cooling chamber, maintaining a third vacuum pressure, and cooling; transferring the glass to a vacuum outlet transfer chamber, maintaining a third vacuum pressure, and increasing the transfer speed for high-speed transfer; transferring the glass to a vacuum outlet buffer chamber, and dropping a vacuum pressure to a second vacuum pressure; transferring the glass to a vacuum outlet chamber, dropping a vacuum pressure to a first vacuum pressure, and outputting finished laminated glass.

Compared with the prior art, the present disclosure has the following positive effects. The production line of the present disclosure has high production efficiency, which is increased by tens to hundreds of times compared with a traditional production line. The continuous production line of the present disclosure has low energy consumption, and the power consumption per square meter is reduced by dozens of times compared with that in the traditional production line. The production line of the present disclosure has good product quality. As the laminated glass is produced under vacuum conditions, the water vapor is exhausted, and the film and the glass are firmly laminated, thereby preventing unqualified laminated glass caused by bubbles and greatly improving the product quality. The production line of the present disclosure has a wide application range; it is not affected by the shape of the glass, and it is also suitable for curved laminated glass.

1. vacuum inlet chamber; 11. first gate valve; 12. first vacuum pump set; 13. first butterfly valve; 14. first air release valve; 2. vacuum inlet buffer chamber; 21. second gate valve; 22. second vacuum pump set; 23. second butterfly valve; 3. vacuum inlet transfer chamber; 31. third gate valve; 4. vacuum heating chamber; 41. fourth gate valve; 42. third vacuum pump set; 43. third butterfly valve; 44. heating wire; 5. vacuum cooling chamber; 51. fifth gate valve 52. cooling fan; 53. insulation board; 6. vacuum outlet transfer chamber; 61. sixth gate valve; 7. vacuum outlet buffer chamber; 71. seventh gate valve; 72. fourth vacuum pump set; 73. fourth butterfly valve; 8. vacuum outlet chamber; 81. eighth gate valve; 82. fifth vacuum pump set; 83. fifth butterfly valve; 84. second air release valve; 9. transfer platform; and 91. ninth gate valve.

DETAILED DESCRIPTION

The technical solutions of the present disclosure are described in more detail below with reference to the specific implementations.

Figure 1:
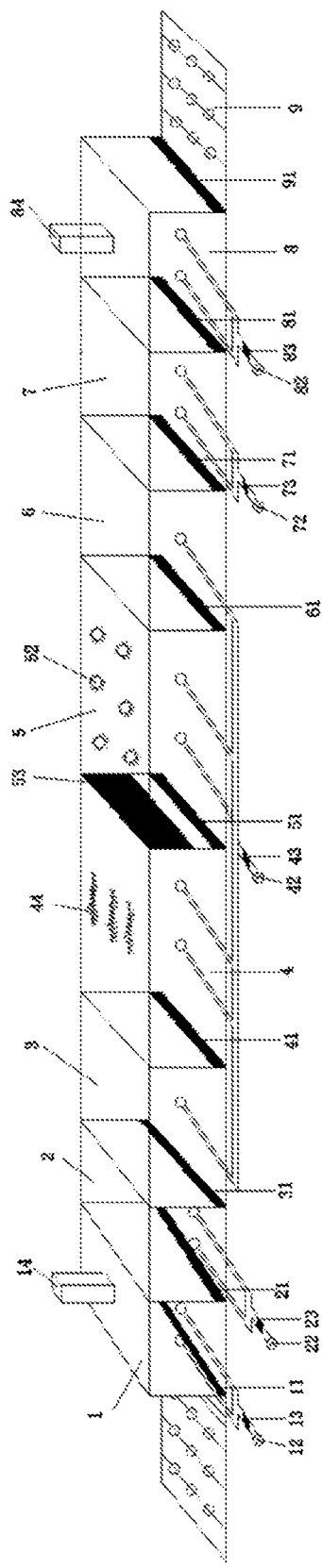
FIG. 1 is a structural diagram of continuous vacuum production equipment for laminated glass according to an embodiment of the present disclosure.
Figure 2:
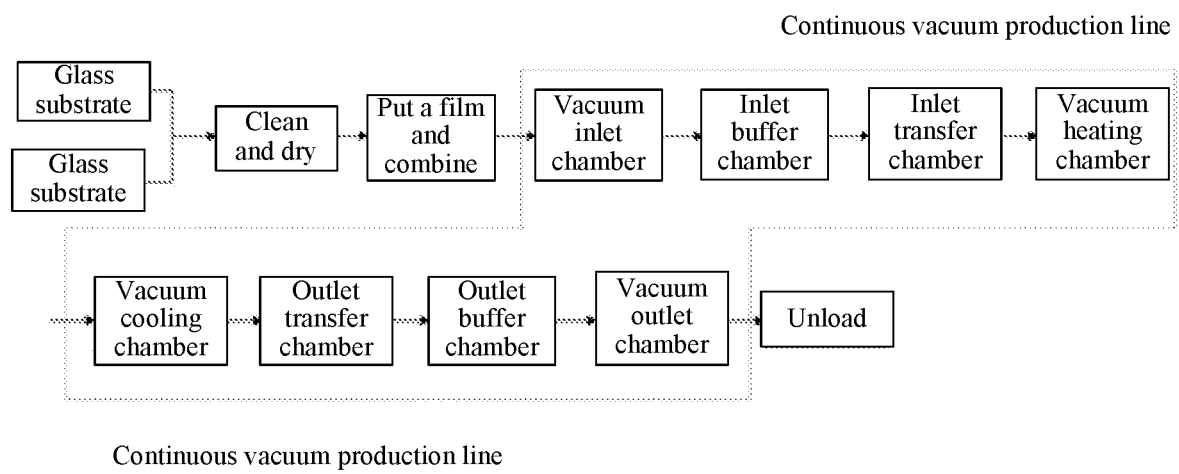
FIG. 2 is a flowchart of continuous vacuum production of laminated glass according to an embodiment of the present disclosure.

An embodiment provides continuous vacuum production equipment for laminated glass. Referring to FIG. 1, the production equipment includes a vacuum inlet chamber 1, a vacuum inlet buffer chamber 2, a vacuum inlet transfer chamber 3, a vacuum heating chamber 4, a vacuum cooling chamber 5, a vacuum outlet transfer chamber 6, a vacuum outlet buffer chamber 7 and a vacuum outlet chamber 8, which are sequentially connected. The production equipment is provided therein with a vacuum pressure adjustment device and a temperature adjustment device. The temperature adjustment device includes an electric furnace wire 44 in the vacuum heating chamber and a high-speed fan 52 in the vacuum cooling chamber. An insulation board 53 is provided between the vacuum heating chamber and the vacuum cooling chamber to prevent heat dissipation. In this embodiment, the chambers are sequentially connected to form a continuous production line. A valve is provided between every two adjacent chambers to control communication of the adjacent chambers, thereby controlling the in and out of glass in the chamber.

An upstream side of the vacuum inlet chamber 1 is connected to a transfer platform 9. A first gate valve 11 is provided between the transfer platform 9 and the vacuum inlet chamber 1. The vacuum inlet chamber 1 is provided therein with a first vacuum pump set 12, a first butterfly valve 13 and a first air release valve 14. Similar to a water valve, the butterfly valve connects the vacuum chamber and the vacuum pump set. When the butterfly valve is opened, the vacuum pump set performs vacuum-pumping. When the butterfly valve is closed, the vacuum pump set is still working, but a pipe connecting the vacuum chamber is blocked, and the air in the vacuum chamber cannot be pumped away.

A second gate valve 21 is provided between the vacuum inlet chamber 1 and the vacuum inlet buffer chamber 2. A second vacuum pump set 22 and a second butterfly valve 23 are provided in the vacuum inlet buffer chamber 2. When the first gate valve 11 is opened, laminated glass is fed into the vacuum inlet chamber 1. Then the first gate valve 11 is closed, and the first butterfly valve 13 is opened to turn on the first vacuum pump set 12 to produce a first vacuum pressure. The vacuum inlet chamber 1 switches an atmospheric pressure to the first vacuum pressure through the first air release valve 14. The second gate valve 21 is opened, and the glass is fed into the vacuum inlet buffer chamber 2. Then the second gate valve 21 is closed, and the second butterfly valve 23 is opened, so that the second vacuum pump set 22 is turned on to evacuate the vacuum inlet buffer chamber 2 to a second vacuum pressure. The first vacuum pressure is $1*10^{-2}$ hPa to $9*10^{-2}$ hPa, and the second vacuum pressure is $1*10^{-4}$ hPa to $9*10^{-4}$ hPa. The vacuum inlet buffer chamber 2 realizes a transition from the first vacuum pressure to the second vacuum pressure by dropping the first vacuum pressure at a rate of more than one hundred times. This transition process is necessary. If there is not such as a vacuum pressure transition, the too large pressure difference from the atmospheric environment to $10^{-6}$ hPa (third vacuum pressure) will cause the gate valve to fail to open. Since vacuuming takes time, if there is not such a transition process, the pumping time will be too long and the production will slow down.

A third gate valve 31 is provided between the vacuum inlet transfer chamber 3 and the vacuum inlet buffer chamber 2. After the glass enters the vacuum inlet transfer chamber 3, the transfer speed is reduced from a high speed of 20-60 m/min to a low speed of 1-5 m/min. The vacuum inlet transfer chamber 3 is provided with a third vacuum pump set 42, which produces a third vacuum pressure, namely $1*10^{-6}$ hPa to $9*10^{-6}$ hPa. The vacuum inlet transfer chamber 3 reduces the transfer speed for a smooth transition, that is, to help the glass to advance at a low and uniform speed in the vacuum heating chamber so as to ensure uniform heating. Therefore, the deceleration process is needed so as to change the high-speed movement of the glass in the vacuum inlet buffer chamber to the low-speed uniform movement in the vacuum heating chamber.

A fourth gate valve 41 is provided between the vacuum heating chamber 4 and the vacuum inlet transfer chamber 3. A heating device 44 is provided in the vacuum heating chamber. The third vacuum pump set 42 communicates the vacuum inlet transfer chamber 3, the vacuum heating chamber 4, the vacuum cooling chamber 5 and the vacuum outlet transfer chamber 6, and is controlled by the third butterfly valve 43. After the glass enters the vacuum heating chamber 4, it is heated at 120-150° C. to make a film fused. The third vacuum pressure is $1*10^{-6}$ hPa to $9*10^{-6}$ hPa, which minimizes the air in the heating chamber, so as to facilitate a tighter lamination between the film and the glass. The vacuum heating chamber 4 is used to heat and fuse the film, and remove the residual air at an interface between the film and the glass substrate.

A fifth gate valve 51 is provided between the vacuum cooling chamber 5 and the vacuum heating chamber 4, and a cooling device 52 is provided in the vacuum cooling chamber 5. After the glass enters the vacuum cooling chamber 5, the third vacuum pressure is maintained in the vacuum cooling chamber 5, and the cooling device is turned on to lower the temperature to room temperature at a rate of not exceeding 5° C./min. The vacuum cooling chamber 5 is used to cool the glass under a vacuum condition to prevent air from entering again. The glass transfer speed is slow, and the vacuum heating chamber 4 and the vacuum cooling chamber 5 cooperate to make the film and the glass fully laminated and the air at the interface between the film and the glass substrate exhausted.

A sixth gate valve 61 is provided between the vacuum outlet transfer chamber 6 and the vacuum cooling chamber 5. After the glass enters the vacuum outlet transfer chamber 6, the transfer speed is increased to 20-60 m/min.

A seventh gate valve 71 is provided between the vacuum outlet buffer chamber 7 and the vacuum outlet transfer chamber 6. A fourth vacuum pump set 72 and a fourth butterfly valve 73 are provided in the vacuum outlet buffer chamber 7. When the fourth butterfly valve 73 is opened, the fourth vacuum pump set 72 is turned on to evacuate to the second vacuum pressure. Then the seventh gate valve 71 is opened, and the glass enters the vacuum outlet buffer chamber 7. Afterwards, the seventh gate valve 71 is closed, the fourth butterfly valve 73 is closed, and the glass is ready to enter the vacuum outlet chamber 8.

An eighth gate valve 81 is provided between the vacuum outlet chamber 8 and the vacuum outlet buffer chamber 7. A fifth vacuum pump set 82, a fifth butterfly valve 83 and a third air release valve 84 are provided in the vacuum outlet chamber. A downstream side of the vacuum outlet chamber is connected with the transfer platform 9, and a ninth gate valve 91 is provided between the vacuum outlet chamber and the transfer platform. When the fifth butterfly valve 83 is opened, the fifth vacuum pump set 82 is turned on to produce a first vacuum pressure. Then the eighth gate valve 81 is opened, and the glass enters the vacuum outlet chamber 8 from the outlet buffer chamber. Afterwards, the eighth gate valve 81 is closed, the second air release valve 84 is opened, and the fifth butterfly valve 83 is closed to reduce the vacuum pressure to an atmospheric pressure. Then the ninth gate valve 91 is opened, and the glass is unloaded through the transfer platform 9.

This embodiment needs to strictly limit the operating time in the vacuum heating chamber and the vacuum cooling chamber. Generally, the operating time depends on the thickness of the glass, the speed of the glass in the vacuum chamber, and the power of the heating wire and the cooling fan. It takes temperature for an interlayer to be fused and laminated with the glass, and it takes time for the glass and the film to absorb heat from room temperature to the process temperature of 120-150° C. The film and the glass can be fully fused only after the glass absorbs heat sufficiently. When the glass enters from the vacuum heating chamber into the vacuum cooling chamber, the temperature should not be too high, and the cooling rate should not be too fast, not exceeding 5° C./min. Otherwise, it will cause the glass to explode thermally, or cause the moisture in the atmosphere to return to the film and cause bubbles. Therefore, it is necessary to gradually cool the glass in the vacuum cooling chamber.

An embodiment provides a production method for laminated glass, which includes the following steps:

S1: Cleaning and drying: Load glass substrates into a cleaning machine through a loading table, and dry for further use after cleaning, where the glass substrates may be any one of flat, single-curved and multi-curved glass.

S2: Laminating: Stack the glass substrates treated in S1 up and down, place a film between the glass substrates, and laminate the glass together, where the film may be any one of polyvinyl butyral (PVB), sentry glass plus (SGP), thermoplastic polyurethane (TPU) and ethylene-vinyl acetate (EVA).

S3: Continuous vacuum production: Transfer the laminated glass obtained in S2 to a vacuum inlet chamber 1 through a transfer platform; evacuate for 10-30 s to a first vacuum pressure of $1*10^{-2}$ hPa to $9*10^{-2}$ hPa to achieve a transition from an atmospheric pressure; transfer the glass at a high speed of 20-60 m/min; then transfer the glass to a vacuum inlet buffer chamber 2, and evacuate to a second vacuum pressure, which is $1*10^{4}$ hPa to $9*10^{-4}$ hPa; transfer the glass to a vacuum inlet transfer chamber 3, and evacuate to a third vacuum pressure, which is $1*10^{-6}$ hPa to $9*10^{-6}$ hPa; reduce the transfer speed to a low speed of 1-5 m/min so as to achieve a transition from high-speed transfer to low-speed transfer; transfer the glass to a vacuum heating chamber 4, maintain a third vacuum pressure, and heat at 120-150° C. to make the film fused and laminated to the glass substrates and remove air at an interface; transfer the glass to a vacuum cooling chamber 5, maintain a third vacuum pressure, and cool down to room temperature; transfer the glass to a vacuum outlet transfer chamber 6, maintain a third vacuum pressure, and increase the transfer speed for high-speed transfer; turn on a fourth vacuum pump set 72 to evacuate to a second vacuum pressure, and then open a seventh gate valve 71 to transfer the glass into a vacuum outlet buffer chamber 7; turn on a fifth vacuum pump set 82 to evacuate to a first vacuum pressure, and then open an eighth gate valve 81 to allow the glass to enter into a vacuum outlet chamber 8; continue to deflate to switch the vacuum pressure to an atmospheric pressure.

The heating in the vacuum heating chamber may be completed by energizing an electric furnace wire provided in the vacuum chamber; the cooling in the vacuum cooling chamber may be completed by a high-speed fan provided in the vacuum chamber; other commonly used heating and cooling methods may also be selected.

S4: Unloading: Allow the glass obtained in S3 to leave the vacuum outlet chamber through the transfer platform to enter an unloading table, and unload to obtain transparent laminated glass, which has a maximum size up to (2300-2500) mm by (3600-3700) mm.

In terms of production efficiency, this embodiment achieves a 24-hour daily production capacity of 38000 m² for 2440 mm*3660 mm glass and 4200 m² for 1000 mm*1000 tempered glass. In contrast, a traditional method has a 24-hour daily production capacity of 1500 m² for 2440 mm*3660 mm glass and 500 m² for 1000 mm*1000 mm tempered glass. In terms of electricity consumption, this embodiment consumes 0.01-0.05 kWh/m², while the traditional method consumes 2-3 kWh/m². In terms of yield, this embodiment reaches 99.9-100%, while the traditional method is 90-95%.

Therefore, this embodiment has the following beneficial effects:

(1) High production efficiency. The production line cancels the preheating and rolling process, and incorporates the traditionally independent two processes into a continuous vacuum production line. Moreover, the vacuum production line can be integrated with a traditional lamination line. The glass runs continuously on the production line, and the production time of the glass depends entirely on the vacuuming time, which greatly improves the production efficiency.

(2) Low energy consumption. This production line eliminates the energy consumed by preheating and rolling and high-temperature high-pressure forming, and adds energy for heating and cooling in the vacuum production line. Since the heat conduction basically disappears under vacuum conditions, the vacuum chambers are like thermoses, in which the ineffective energy consumption is greatly reduced.

(3) High yield. This production line eliminates the processes of preheating and rolling and high-temperature high-pressure forming. Therefore, many traditional control factors such as preheating temperature, height, flatness and pressure during rolling, and the temperature, pressure and their rise and fall rates in the autoclave can be ignored, thereby greatly improving the yield.

(4) Wide application range. This production line is also suitable for curved laminated glass. It does not need preheating and rolling and high-temperature high-pressure forming. The heating and de-airing of the glass are completed in chambers on the vacuum production line. As long as the volume of the chambers on the vacuum production line exceeds the volume of the curved glass, the production of curved laminated glass is easy to achieve.

Embodiment 1

This embodiment provides a production method for 6 mm+1.52 PVB+6 mm laminated glass, which includes the following steps:

S1: Vacuum inlet chamber 1: Open a first gate valve 11 under an atmospheric condition to transfer glass into a vacuum inlet chamber 1; close the first gate valve 11, and open a first butterfly valve 13 to turn on a first vacuum pump set 12; open a second gate valve 21 when a vacuum pressure reaches $10^{-2}$ hPa, and transfer the glass to a vacuum inlet buffer chamber; close the second gate valve, and open a first air release valve 14 to restore an atmospheric pressure for a new round of glass transfer, where the glass is transferred at a speed of 60 m/min.

S2: Vacuum inlet buffer chamber 2: Open, after the glass enters the vacuum inlet buffer chamber, a second butterfly valve 23 to turn on a second vacuum pump set 22; open, when a vacuum pressure reaches $10^{-4}$ hPa, a third gate valve 31 to transfer the glass to a vacuum inlet transfer chamber; then close the third gate valve 31.

S3: Vacuum inlet transfer chamber 3: Reduce, after the glass is completely transferred to the vacuum inlet transfer chamber, the transfer speed to 2 m/min, and turn on a third vacuum pump set 42 to vacuum to $10^{-6}$ hPa.

S4: Vacuum heating chamber 4: Open a fourth gate valve 41 to transfer the glass to a vacuum heating chamber 4; close the fourth gate valve 41, and open a third butterfly valve 43 to maintain a vacuum pressure of $10^{-6}$ hPa; move the glass at a speed of 2 m/min at 120-150° C. for 30 min by a fan power of 100 KW, so that a film is fused and laminated with glass substrates and air at an interface is removed.

S5: Vacuum cooling chamber 5: Open a fifth gate valve 51 to transfer the glass to a vacuum cooling chamber; close the fifth gate valve 51, and maintain a vacuum pressure of $10^{-6}$ hPa; turn on a cooling fan 52 to cool down to room temperature; keep running with a transfer speed of 2 m/min and a fan power of 100 KW for 30 min.

S6: Vacuum outlet transfer chamber 6: Open a sixth gate valve 61 to transfer the glass to a vacuum outlet transfer chamber; close the sixth gate valve 61, increase the speed to 60 m/min, and maintain a vacuum pressure of $10^{-6}$ hPa.

S7: Vacuum outlet buffer chamber 7: Open a fourth butterfly valve 73, and turn on a fourth vacuum pump set 72 to vacuum to a second vacuum pressure of $10^{-4}$ hPa; open a seventh gate valve 71 to transfer the glass to a vacuum outlet buffer chamber; close the seventh gate valve 61 to make the glass ready to enter a vacuum outlet chamber 8.

S8: Vacuum outlet chamber 8: Open a fifth butterfly valve 83, and turn on a fifth vacuum pump set 82 to evacuate to a first vacuum pressure of $10^{-2}$ hPa; open an eighth gate valve 81 to transfer the glass to the vacuum outlet chamber; close the eighth gate valve 81, open a second air release valve 84, and close the fifth butterfly valve 83 to switch the vacuum pressure to an atmospheric pressure; open a ninth gate valve 91 to make the glass leave the vacuum outlet chamber at a high speed; unload the glass through a transfer platform.

This production method produces 12,600 $m^2$ of 2,440 mm*3,660 mm glass in 8 hours, with an energy consumption of 0.01 kWh/$m^2$ and a yield of 99.95%.

The above embodiments are only a few of the several preferred embodiments of the present disclosure. It should be noted that the present disclosure is not limited to the above embodiments. For those of ordinary skill in the art, it is still possible to modify the technical solutions described in the above embodiments or equivalently replace some of the technical features therein. These modifications or replacements should not cause the essence of the corresponding technical solutions to deviate from the spirit and scope of the technical solutions claimed by the present disclosure.

What is claimed is:

1. A production method for laminated glass, comprising the following steps:
    loading laminated glass into a vacuum inlet chamber, evacuating to a first vacuum pressure, and transferring the laminated glass at a transfer speed for a first speed transfer;
    transferring the laminated glass to a vacuum inlet buffer chamber, and evacuating to a second vacuum pressure;
    transferring the laminated glass to a vacuum inlet transfer chamber, reducing the transfer speed for the first speed transfer to a transfer speed for a second speed transfer, and evacuating to a third vacuum pressure;
    transferring the laminated glass to a vacuum heating chamber, maintaining the third vacuum pressure, and heating;
    transferring the laminated glass to a vacuum cooling chamber, maintaining the third vacuum pressure, and cooling;
    transferring the laminated glass to a vacuum outlet transfer chamber, maintaining the third vacuum pressure, and increasing the transfer speed for the second speed transfer to the transfer speed for the first speed transfer;
    transferring the laminated glass to a vacuum outlet buffer chamber, and dropping a vacuum pressure to the second vacuum pressure; and
    transferring the laminated glass to a vacuum outlet chamber, dropping a vacuum pressure to the first vacuum pressure, and outputting finished laminated glass.

2. The production method for laminated glass according to claim 1, wherein the first vacuum pressure is $1*10^{-2}$ hPa to $9*10^{-2}$ hPa, the second vacuum pressure is $1*10^{-4}$ hPa to $9*10^{-4}$ hPa, and the third vacuum pressure is $1*10^{-6}$ hPa to $9*10^{-6}$ hPa.

3. The production method for laminated glass according to claim 1, wherein the transfer speed for the first speed transfer is 20-60 m/min, and the transfer speed for the second speed transfer is 1-5 m/min.

4. The production method for laminated glass according to claim 1, wherein the heating in the vacuum heating chamber is performed at 120-150° C.

5. The production method for laminated glass according to claim 1, wherein a rate of cooling in the vacuum cooling chamber is not greater than 5° C./min.

6. The production method for laminated glass according to claim 1, wherein a time for transiting from an atmospheric pressure to the first vacuum pressure is 10-30 s.

7. The production method for laminated glass according claim 1, wherein the laminated glass comprises an upper glass substrate, an intermediate film layer and a lower glass substrate which are sequentially stacked together.

8. The production method for laminated glass according to claim 7, wherein the glass substrate is any one of flat, single-curved and multi-curved glass.

9. The production method for laminated glass according to claim 7, wherein the film is any one of polyvinyl butyral (PVB), sentry glass plus (SGP), thermoplastic polyurethane (TPU) and ethylene-vinyl acetate (EVA).

10. The production method for laminated glass according to claim 1, wherein an electric furnace wire is provided in the vacuum heating chamber, a fan is provided in the vacuum cooling chamber, and an insulation board is provided between the vacuum heating chamber and the vacuum cooling chamber.

11. The production method for laminated glass according to claim 2, wherein the laminated glass comprises an upper glass substrate, an intermediate film layer and a lower glass substrate which are sequentially stacked together.

12. The production method for laminated glass according to claim 3, wherein the laminated glass comprises an upper glass substrate, an intermediate film layer and a lower glass substrate which are sequentially stacked together.

13. The production method for laminated glass according to claim 4, wherein the laminated glass comprises an upper glass substrate, an intermediate film layer and a lower glass substrate which are sequentially stacked together.

14. The production method for laminated glass according to claim 5, wherein the laminated glass comprises an upper glass substrate, an intermediate film layer and a lower glass substrate which are sequentially stacked together.

15. The production method for laminated glass according to claim 6, wherein the laminated glass comprises an upper glass substrate, an intermediate film layer and a lower glass substrate which are sequentially stacked together.

16. The production method for laminated glass according to claim 2, wherein an electric furnace wire is provided in the vacuum heating chamber, a fan is provided in the vacuum cooling chamber, and an insulation board is provided between the vacuum heating chamber and the vacuum cooling chamber.

17. The production method for laminated glass according to claim 3, wherein an electric furnace wire is provided in the vacuum heating chamber, a fan is provided in the vacuum cooling chamber, and an insulation board is provided between the vacuum heating chamber and the vacuum cooling chamber.

18. The production method for laminated glass according to claim 4, wherein an electric furnace wire is provided in the vacuum heating chamber, a fan is provided in the vacuum cooling chamber, and an insulation board is provided between the vacuum heating chamber and the vacuum cooling chamber.

19. The production method for laminated glass according to claim 5, wherein an electric furnace wire is provided in the vacuum heating chamber, a fan is provided in the vacuum cooling chamber, and an insulation board is provided between the vacuum heating chamber and the vacuum cooling chamber.

20. The production method for laminated glass according to claim 6, wherein an electric furnace wire is provided in the vacuum heating chamber, a high-speed fan is provided in the vacuum cooling chamber, and an insulation board is provided between the vacuum heating chamber and the vacuum cooling chamber.

* * * * *